US006496682B2

(12) United States Patent
Butte et al.

(10) Patent No.: US 6,496,682 B2
(45) Date of Patent: Dec. 17, 2002

(54) SATELLITE COMMUNICATION SYSTEM EMPLOYING UNIQUE SPOT BEAM ANTENNA DESIGN (75) Inventors: Eric G Butte, Cupertino, CA (US); Randall D Tyner, Mountain View, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/152,555

(22) Filed: Sep. 14, 1998

(65) Prior Publication Data

US 2002/0068526 A1 Jun. 6, 2002

(51) Int. Cl.[7] ............................................. H04B 7/185
(52) U.S. Cl. ...................... 455/12.1; 455/13.1; 455/13.3
(58) Field of Search ................................. 455/429, 427, 455/428, 430, 12.1, 13.1, 13.4, 13.3

(56) References Cited

U.S. PATENT DOCUMENTS

| | | | |
|---|---|---|---|
| 4,189,675 A | | 2/1980 | Reilly et al. ................... 325/4 |
| 4,232,266 A | | 11/1980 | Acampora .................... 370/79 |
| 4,425,639 A | | 1/1984 | Acampora et al. ............ 370/50 |
| 4,752,925 A | * | 6/1988 | Thompson et al. ......... 370/307 |
| 4,819,227 A | | 4/1989 | Rosen .......................... 370/75 |
| 4,931,802 A | * | 6/1990 | Assal et al. ................. 342/356 |
| 5,287,543 A | | 2/1994 | Wolkstein .................. 455/13.3 |
| 5,497,169 A | * | 3/1996 | Wu ............................. 343/909 |
| 5,546,097 A | | 8/1996 | Ramanujam et al. ... 343/781 R |
| 5,576,721 A | * | 11/1996 | Hwang et al. .............. 343/753 |
| 5,619,525 A | | 4/1997 | Wiedeman et al. ......... 375/200 |
| 5,649,310 A | | 7/1997 | Tyner et al. ................. 455/129 |
| 5,655,005 A | | 8/1997 | Wiedeman et al. ......... 370/320 |
| 5,668,556 A | * | 9/1997 | Rouffet et al. .............. 342/354 |
| 5,687,195 A | | 11/1997 | Hwang et al. .............. 375/345 |
| 5,751,254 A | * | 5/1998 | Bird et al. .................. 343/761 |
| 5,790,070 A | * | 8/1998 | Natarajan et al. .......... 342/354 |
| 5,796,370 A | | 8/1998 | Courtonne et al. ......... 343/781 |
| 5,815,527 A | | 9/1998 | Erving et al. ............... 375/206 |
| 5,848,060 A | | 12/1998 | Dent ........................... 370/281 |
| 5,861,855 A | * | 1/1999 | Arsenault et al. ........... 343/704 |
| 5,878,037 A | | 3/1999 | Sherman ..................... 370/335 |
| 5,884,142 A | | 3/1999 | Wiedeman et al. ........ 455/12.1 |
| 5,940,737 A | * | 8/1999 | Eastman ..................... 455/3.2 |
| 5,956,620 A | | 9/1999 | Lazaris-Brunner et al. 455/12.1 |
| 5,987,037 A | | 11/1999 | Gans .......................... 370/480 |
| 5,995,495 A | | 11/1999 | Sampson .................... 370/316 |
| 6,029,044 A | * | 2/2000 | Arsenault et al. ........... 455/3.2 |
| 6,032,041 A | | 2/2000 | Wainfan et al. ............ 455/427 |
| 6,339,707 B1 | * | 1/2002 | Wainfan et al. ............ 455/427 |

OTHER PUBLICATIONS

"The Thermal Control System Of the German Direct Transmitting Communication Satellite TV–SAT", Kreeb, Helmut et al., AIAA, Conf. 8, 1980, 8 pages.

Flight Hardware Test Results Obtained On High Power Equipment And On The Repeater Subsystem Of A 12GHz D8S, W. Liebisch et al., AIAA, 1986, pp. 266–274.

* cited by examiner

Primary Examiner—Edward F. Urban
Assistant Examiner—Naghmeh Mehrpour
(74) Attorney, Agent, or Firm—Perman & Green, LLP (57) ABSTRACT

A satellite communication system includes a plurality of spacecraft in geosynchronous orbit, where each spacecraft provides a plurality of beams on the surface of the earth, and a plurality of ground stations individual ones of which are located in one of the beams for transmitting uplink signals to one of the spacecraft. Each spacecraft has a plurality of receivers for receiving a plurality of the uplinked signals from ground stations, a frequency translator for translating the received uplink signals to a transmission frequency of a plurality of downlink signals, and a plurality of transmitters for transmitting the plurality of downlink signals within the same beams as the corresponding uplink signals. In accordance with the invention the beams have at least one of different sizes and shapes, including circular and elliptical, and are non-contiguous over a least a portion of the surface of the earth.

26 Claims, 8 Drawing Sheets

SATELLITE COMMUNICATION SYSTEM EMPLOYING UNIQUE SPOT BEAM ANTENNA DESIGN

FIELD OF THE INVENTION:

This invention relates generally to spacecraft communication systems and, in particular, to spacecraft communication systems that have at least one spacecraft that receives uplink signals from a number of ground station transmitters located within a particular beam, and that frequency shifts and retransmits the received uplink signals to receivers located within the same particular beam.

BACKGROUND OF THE INVENTION:

The use of a geosynchronous orbit satellite to broadcast television signals to terrestrial receivers is well known in the art. By example, reference can be had to the following two publications: "Flight Hardware Test Results Obtained on High Power Equipment and on the Repeater Subsystem of 12GHz DBS", W. Liebisch et al., 86-0646 AIAA, pp. 266–274, 1986; and "The Thermal Control System of the German Direct Transmitting Communication Satellite TV-SAT", Kreeb et al., AIAA 8th Communications Satellite Systems Conference, Apr. 20–24, 1980.

A number of problems are presented in the design of a high performance satellite communications system that provides, for example, television service to terrestrial receivers spread over a large geographical area. In such a system a number of different ground stations, each associated with a different locale and demographic market, may each transmit an uplink signal that is intended to be received by a spacecraft, such as a geosynchronous orbit satellite, and then transmitted, through one or more transponder channels, from the spacecraft to television receivers within the locale served by the ground station. For example, one ground station may serve the New York City area, another may serve the St. Louis area, while another serves the Salt Lake City area. Each ground station can provide one or more television channels, and is considered to be located within a particular spacecraft beam. More than one ground station can be serviced by a particular beam.

As can be appreciated, in such a system the size and hence downlink power requirements of each service area may differ significantly. That is, for a predetermined amount of RF power at the ground, more spacecraft transmitter power is required for a large beam than for a small beam. Furthermore, and in order to maximize the total number of ground stations that can be serviced, the spacecraft will require a significant number of uplink receivers, as well as a significant number of downlink power amplifiers, typically implemented as Travelling Wave Tube Amplifiers (TWTAs). In addition, it is important to provide some capability to control the transmission power so as to compensate for localized signal impairments, typically rain attenuation, that may be experienced at any given time in one locale but not in others.

It is known to provide gain and RF power control of transponder channels on one downlink beam with one ground station, but not with gain and RF power control of different transponder channels with multiple ground stations in a downlink beam.

Figure 1A:
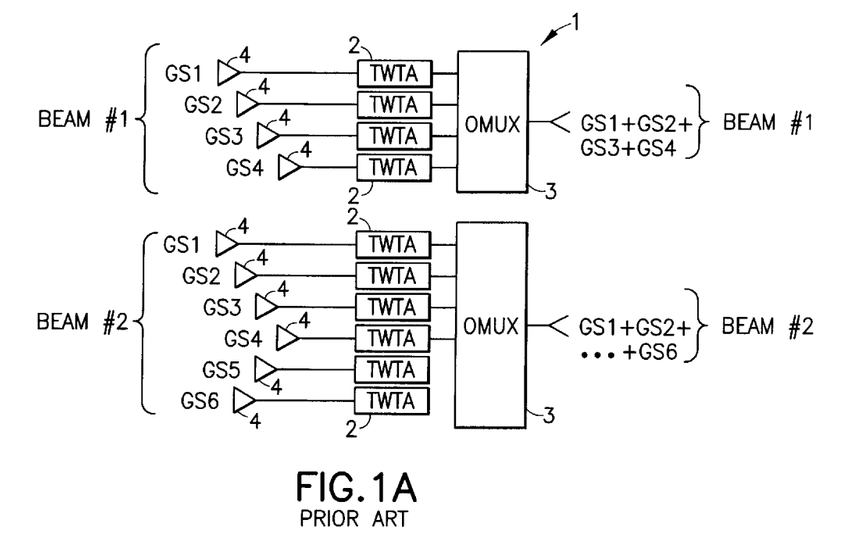
FIG. 1A is a simplified block diagram showing a portion of a conventional spacecraft communications payload, specifically the use of individual TWTAs for individual transponder channels.

In accordance with the prior art, and referring to FIG. 1A, a spacecraft communication system may have a spacecraft 1 that uses separate TWTAs 2 that each receive a separate signal from ground stations (GSs) located within the same or different beams. By example, a first beam (beam #1) may include four ground stations (GS1–GS4) while a second beam (beam #2) may include six different ground stations (GS1–GS6). Each ground station signal is passed through a separate spacecraft transponder channel, which includes a channel amplifier circuit, shown generally as an amplifier 4, and a TWTA 2. Each channel amplifier circuit 4 may be separately gain and/or RF power controlled by the associated ground station. The outputs of the TWTAs 2 for each beam are combined in an output multiplexer (OMUX) 3 prior to transmission on the downlink to the terrestrial receivers in each regional or spot beam.

It can be realized that this conventional approach can be wasteful of power and TWTAs, as each transponder channel will typically have differing RF power requirements. If it were desired to use only one type of TWTA (e.g., a 60 W TWTA) or only two types (e.g., 60 W and 120 W), then a transponder channel that requires only 10 W of RF power will use its TWTA much less efficiently than another transponder channel that requires 50 W of RF power.

Further in accordance with the prior art a single size spot beam may be provided that is contiguous across the continental United States (CONUS). Alternatively, and as is exemplified by U.S. Pat. No. 4,819,227, "Satellite Communications System Employing Frequency Reuse" to H. A. Rosen, a two-way satellite communication system can use spot beams in contiguous zones. In general, the prior art requires either more satellites or larger spot beam spacing, using a single size of spot beams, to obtain a required performance. The prior art may as well, use more antennas interlaced over the CONUS area, with larger feed spacings and thus require more area on the satellite.

It is also known from the prior art to provide as many receivers as the total number of transponder channels, or as many as the number of feeds/beams, and to have each receiver translate its associated transponder channel or feed/beam to the appropriate downlink channel frequencies. Referring to FIG. 1C, the prior art teaches a system that uses either a single receiver 7 for one transponder or a single receiver 7 for one feed or one beam. As was also the case for FIG. 1A, each GS signal may originate from a separate geographical area (e.g., from ground stations located in different urban areas).

As can be appreciated, and as was also the case for FIG. 1A, the prior art approaches are not efficient with regard to spacecraft power consumption, weight, and/or payload utilization.

OBJECTS AND ADVANTAGES OF THE INVENTION:

It is a first object and advantage of this invention to provide an improved satellite communications system wherein a plurality of spot beams have different sizes and shapes, including circular and elliptical shapes.

It is another object and advantage of this invention to provide an improved satellite communications system wherein a communications satellite payload includes a plurality of antennas providing various sized spot beams.

It is a further object and advantage of this invention to provide an improved satellite communications system wherein a plurality of communications satellites each include a communications satellite payload having a plurality of reflector antennas providing various sized and various shaped spot beams for selectively serving a plurality of terrestrial regions.

SUMMARY OF THE INVENTION

Certain of the foregoing and other problems are overcome and the objects and advantages are realized by methods and apparatus in accordance with embodiments of this invention.

In accordance with this invention there is provided a satellite communication RF power control system to deliver digital data, such as digital television data, from multiple ground stations to a single spot or regional beam.

In accordance with the teaching of this invention there is provided an ability to use the spacecraft communication system to deliver digital data from a ground station within a spot beam to the same spot beam, one way, via various antenna spot beam patterns. The patterns use a variation of different sized spot beams each having either a non-circular shape or a circular shape, or a combination of both shapes to cover an entire geographical area that is to be serviced. This type of service can thus accommodate differences in markets, demographics, languages, etc.

A combination of non-circular (e.g., elliptical) and circular spot beams of different sizes is used to form a non-contiguous pattern or non-contiguous zones, thereby providing enhanced interbeam isolation. An example of the utility of this invention is an ability to provide coverage of all of the CONUS Nielsen DMAs with two spacecraft in a single or multiple geosynchronous orbits. This technique improves frequency reuse of a given bandwidth, with a minimum set of antennas and spacecraft, versus a conventional contiguous approach for the spot beam locations.

In the preferred embodiment there are two spacecraft in a single geosynchronous orbit location, e.g., within about 0.2°, that are used to cover all of the DMAs using alternate spot beam locations between the two spacecraft. Each spacecraft uplinks in a single polarity, but opposite from the other spacecraft. Each spacecraft's downlink polarity is the opposite of its uplink polarity.

The two spacecraft system design can either use all different size non-circular spot beams, all different size circular spot beams, or a combination of different size non-circular and circular spot beam shapes to cover all of the DMAs.

A satellite communication system includes a plurality of spacecraft in geosynchronous orbit, where each spacecraft provides a plurality of beams on the surface of the earth, and a plurality of ground stations individual ones of which are located in one of the beams for transmitting uplink signals to one of the spacecraft. Each spacecraft has a plurality of receivers for receiving a plurality of the uplinked signals from ground stations, a frequency translator for translating the received uplink signals to a transmission frequency of a plurality of downlink signals, and a plurality of transmitters for transmitting the plurality of downlink signals within the same beams as the corresponding uplink signals. Each of the plurality of receivers may be gain controlled by a corresponding one of the ground stations. In accordance with the invention the beams have at least one of different sizes and shapes, including circular and non-circular, such as elliptical, and are non-contiguous and non-overlapping over at least a portion of the surface of the earth, such as CONUS. Each spacecraft is comprised of a plurality of different sized reflector antennas for transmitting and receiving the beams.

The uplink beams to a first one of the satellites have a first polarization and the downlink beams have a second, opposite polarization, and the uplink beams to a second one of the satellites have the second polarization and the downlink beams have the first polarization.

In the preferred embodiment the uplink and downlink signals comprise digital data signals, such as digital television signals. In this case individual ones of the spot beams overlie a predetermined one of a designated television market area.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2A:
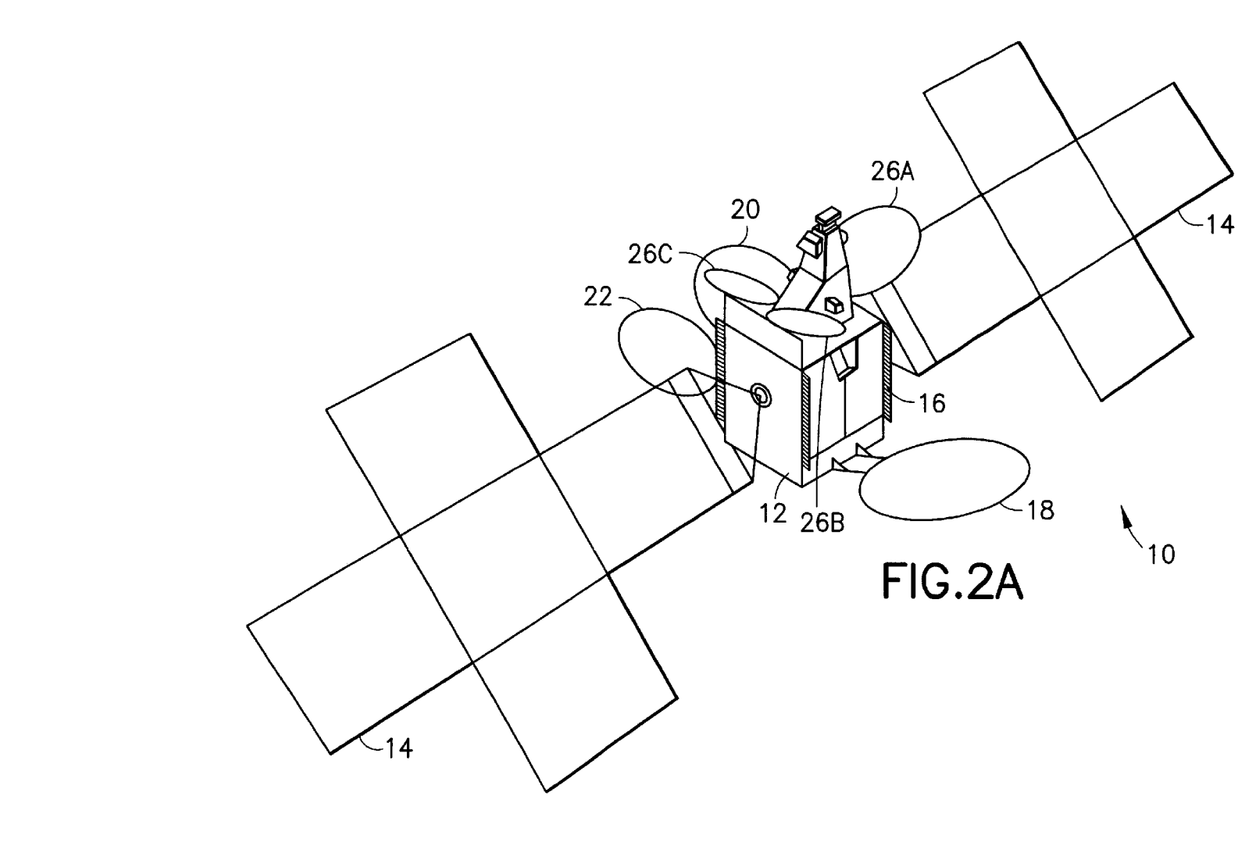
FIG. 2A is an elevational view of a communications spacecraft that is suitable for practicing this invention.
Figure 2B:
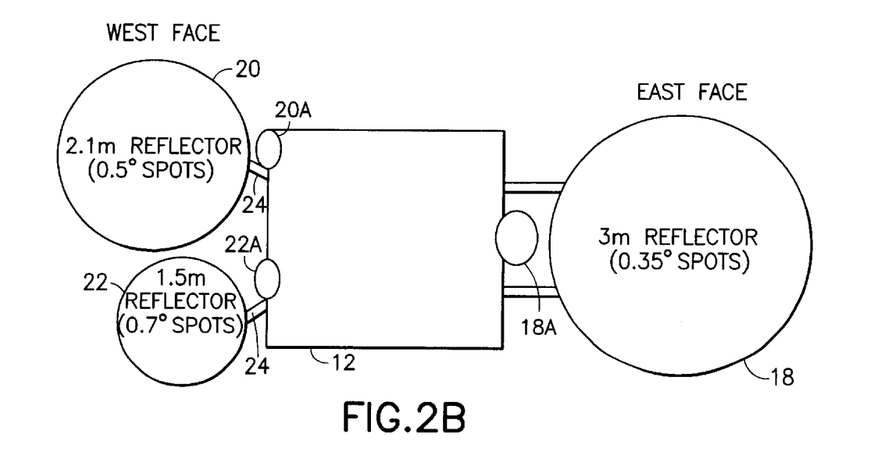
FIG. 2B depicts a portion of the spacecraft of FIG. 2A, and shows in greater detail three antenna reflectors for generating different size spot beams.

Reference is made to FIGS. 2A and 2B for illustrating a geosynchronous orbit satellite or spacecraft 10 that is suitable for practicing this invention. In the ensuing description it will be assumed that two such spacecraft are employed together for providing direct spacecraft digital television coverage to localized regions of the continental United States (see also FIGS. 4A and 4B), as well as to Hawaii and Alaska. It should, however, be realized at the outset that the teachings of this invention are not limited to providing only digital television signals, but can be used to provide any type of digital data, including but not limited to digitized voice, facsimile, paging, and computer network data, including Internet data packets. The teaching of this invention is also not limited to the use of two spacecraft, as more or less than this number can be used, nor is the teaching limited to, by example, only the specific frequencies and/or numbers, sizes and/or shapes of beams that will be described below. The teachings of this invention are further not intended to be limited by the specific numbers of transponders or channel amplifiers, or by the specific types of antennas, polarizations, High Power Amplifiers (HPAs), such as TWTAs, etc.

In FIGS. 2A and 2B the spacecraft 10 includes a bus 12 and solar cell arrays 14. Mounted to the bus 12 are a plurality of direct radiating TWTAs 16, such as Ka band, or Ku band, or C band TWTAs. For a Ka band case, three antennas are used per spacecraft to generate the spot beams: a 3 meter Gregorian antenna 18 TX/RCV antenna for generating a 0.35° spot beam, a 2.1 meter offset feed TX/RCV antenna 20 for generating a 0.5° spot beam, and a 1.5 meter offset feed TX/RCV antenna 22 for generating a 0.7° spot beam. Antenna pointing mechanisms 24 are provided, as is a steerable subreflector 18A that provides autotracking for the 3 meter antenna 18. Other antennas include two shaped Gregorian antennas 26A and 26B. for high definition television (HDTV), as well as one shaped Gregorian antenna 26C for providing conditional access to a ground controller. The antennas 26A–26C are not germane to the teachings of this invention, and are not described further with any degree of specificity. Each antenna is preferably autotracked for providing very low pointing error.

Although described in the context of Gregorian antennas, the antennas could be implemented as well with Cassegrain antennas. In general, the use of Gregorian or Cassegrain antennas is preferred for providing large scan capability with high side lobe isolation. The ratio of focal length to diameter (F/D) is preferably in the range of about two to about three. Furthermore, and while illustrated as circular antennas, it can be appreciated that one or more of the antennas 18, 20 or 22 could have a non-circular shape, such as an elliptical shape, for providing non-circular shaped beams at the surface of the earth.

The 3 meter Ka band 0.35° antenna 18 is located on the east face of the spacecraft 10, and the subreflector 18A is used for this large antenna because it is much lighter and easier to steer than the main reflector. The subreflector 18A provides additional benefits. For example, the transmit and receive beams have the same boresight, whereas there is a small offset when simple offset reflectors are used. This is particularly important for this small beam.

Eleven beams are generated from the 3 meter antenna 18 for the LHCP spacecraft, whereas the 3 meter antenna on the RHCP spacecraft generates 12 beams. The antenna 18 is preferably boresighted in the southeast portion of CONUS to minimize scan losses in the high rain areas. The beam spacing enables the use of $2\lambda$ or larger feeds. This feed diameter reduces spillover loss and sidelobe levels.

The Ka band 2.1 meter, 0.50 and 1.5 meter, 0.7° antennas 20 and 22 are located side-by-side on the west face of the spacecraft 10. These antennas use two-axis gimbaled mechanisms for deployment. The subreflectors 20A and 22A are provided as described above.

In the illustrated, but not limiting, embodiment the LHCP spacecraft has ten 0.5° beams and the RHCP spacecraft has eleven beams. The 1.5 m, 0.7° antennas generates 9 CONUS beams and the Hawaii beam on the LHCP spacecraft. The RHCP spacecraft 0.7° antenna generates 8 CONUS beams. The Alaska beam may also be generated from this antenna using two feeds to create an elliptical pattern.

In one embodiment the system uses a 700 MHz frequency band at Ka-band with a 29.3–30 GHz uplink and a 19.5–20.2 GHz downlink. The frequency plan provides 46 26 MHz transponders, 23 on each polarization. The HDTV system uses 12 transponders, while the SDTV system uses 34. The spot beams are divided between the two spacecraft by polarization. Spacecraft 1 processes 149 transponders in 31 Left Hand Circular Polarization (LHCP) beams, while spacecraft 2 processes 145 transponders in 32 Right Hand Circular Polarization (RHCP) beams.

Figure 3A:
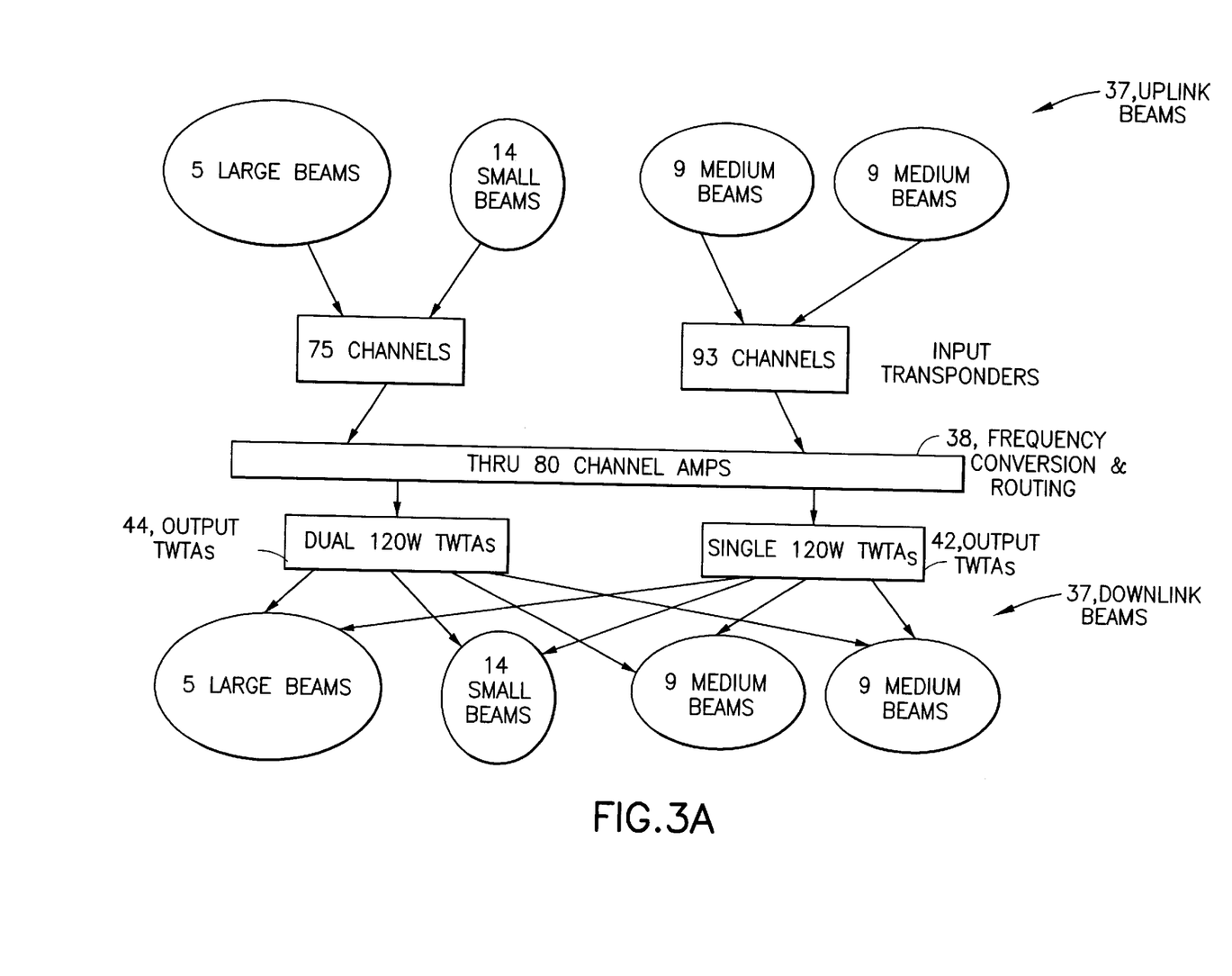
FIG. 3A is a diagram illustrating a generalized spacecraft payload for an exemplary 37 beam uplink and downlink case.
Figure 3B:
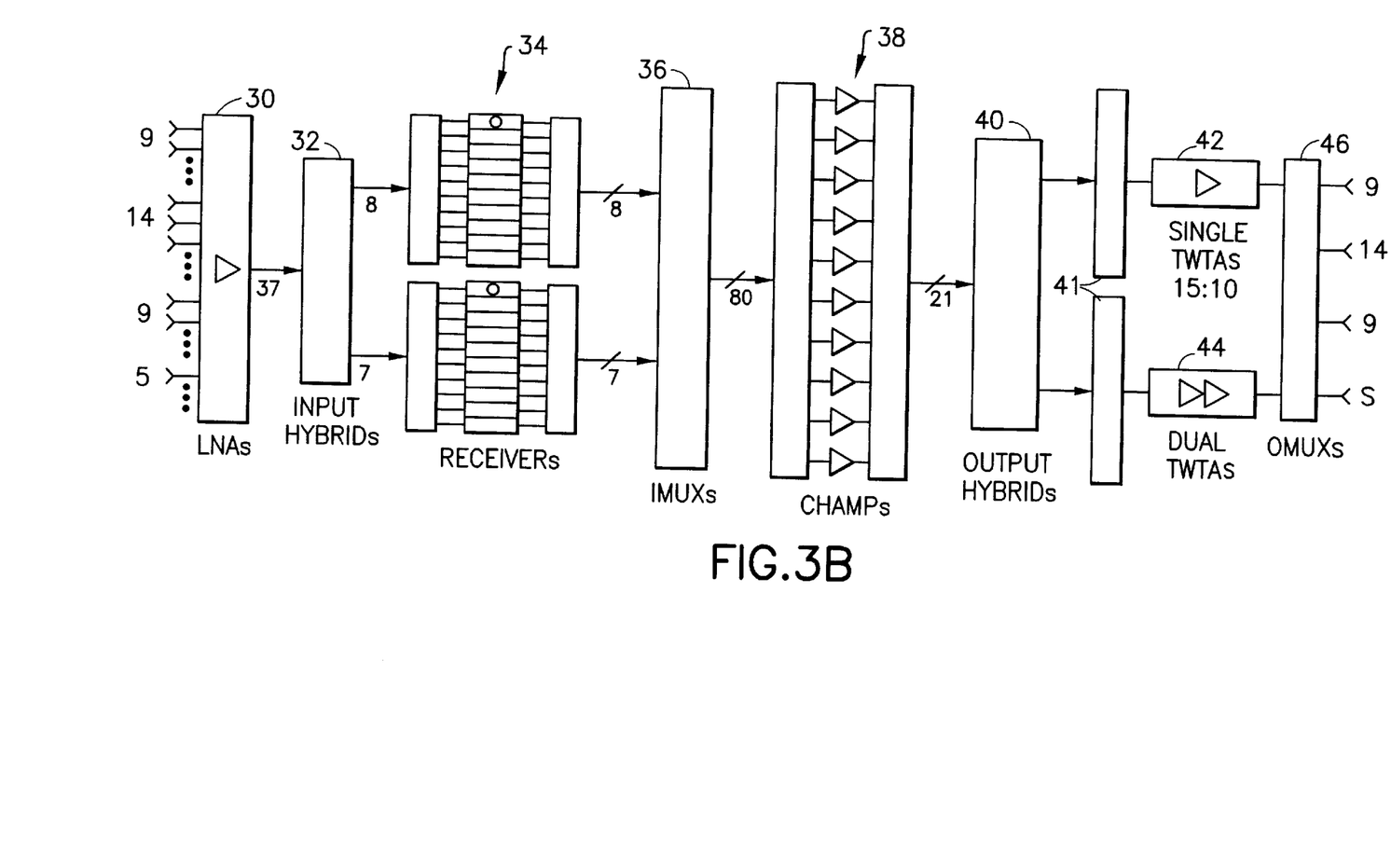
FIG. 3B is a circuit block diagram of the spacecraft payload for the exemplary 37 beam uplink and downlink case shown in FIG. 3A.

Referring to FIGS. 3A and 3B, the repeater is a single-conversion design. The 30 GHz uplinks (37 beams of different sizes) are amplified by low noise amplifiers (LNAs) 30 and applied though input hybrids 32 to receivers 34. The uplinks are amplified and down-converted by a 9.8 GHz local oscillator (LO) to the 20-GHZ downlink band. The signals from each beam are then separated in input multiplexers 36 and applied to channel amplifiers 38, and then to output hybrids 40. Each beam's transponders are amplified as a group in a high-power, linearized TWTA 42 operating at a 2.5 dB to 3 dB output backoff. In some cases where beams have only a few transponders and also require low power, signals from two beams are amplified in the same TWTA, then separated in an output multiplexer 46. Single 120 W and dual (paralleled) 120 W TWTAs 42 and 46 are provided.

This design approach minimizes the payload mass and complexity. The input multiplexers enable the uplinks to be received using only 11 active receivers instead of 30 or 31 if individual receivers were used for each beam. By processing the signals from each beam as a group, much fewer filters and channel amplifiers are required. Use of one single size TWTA (e.g., 120 W) permits the use of large redundancy rings to improve reliability. The TWTA is a direct-radiating collector (DRC) design, which radiates over half the thermal dissipation to space instead of into the spacecraft body, greatly simplifying the spacecraft thermal design.

Each channel amplifier 38 preferably provides a nominal 50 dB of gain. The output level is commandable in 0.5 dB steps over, by example, a 6 dB range so that the drive to the TWTAs 42, 44 can be set precisely.

Output linearizers 41 are preferably optimized for TWTA output backoffs from about 2 dB to about 3 dB. The TWTAs use one EPC for two TWTs. This yields excellent phase tracking when two or more TWTAs are operated in the combined (paralleled) high power mode. Reference in this regard can be had to commonly assigned U.S. Pat. No. : U.S. Pat. No. 5,649,310, "Signal Translation and Amplification System Including a Thermal Radiation Panel Coupled Thereto", by Randall D. Tyner et al., the disclosure of which is incorporated by reference herein in its entirety.

Figure 1B:
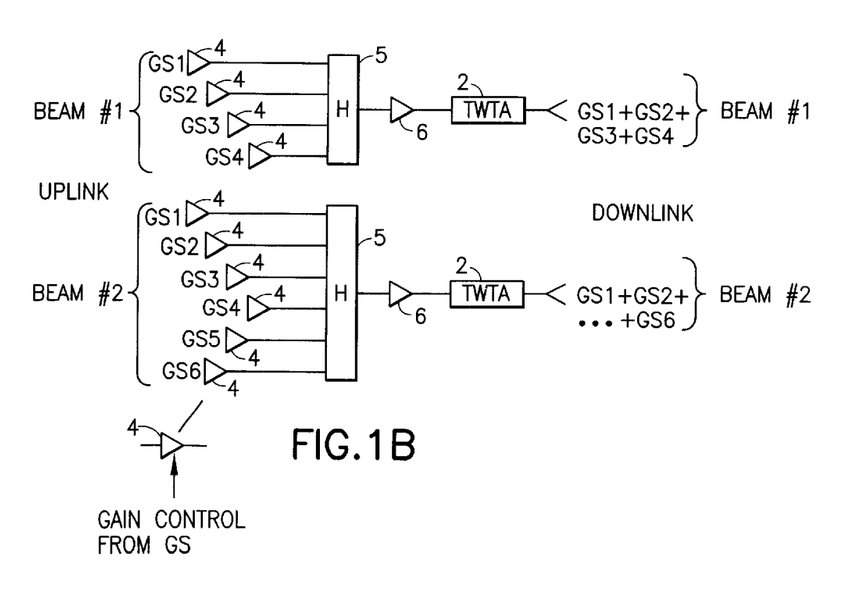
FIG. 1B is a simplified block diagram of a portion of a spacecraft communications payload in accordance with an aspect of this invention, wherein a plurality of transponder channels are combined and fed to a single TWTA.
Figure 1C:
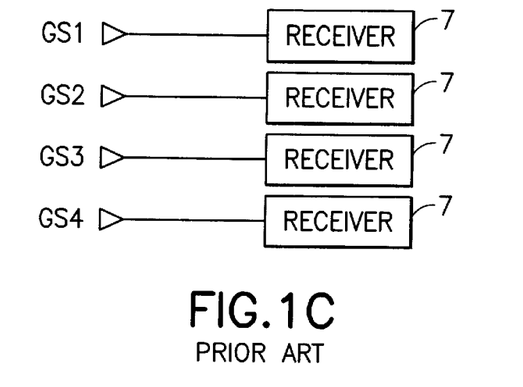
FIG. 1C is a simplified block diagram showing another portion of a conventional spacecraft communications payload, specifically the use of individual receivers for individual transponder channels.

In accordance with an aspect of this invention, and referring to FIG. 1B, there is provided a satellite communication RF power control system to deliver digital data, such as digital television data, from multiple ground stations to a single spot or regional beam. Each ground station in the spot or regional beam has separate and individual control of the RF power for their transponder channel or channels. The RF power control for each individual ground station enables adjustment of downlink power due to rain attenuation within the spot or regional beam. That is, power adjustments are performed in a particular transponder channel prior to combination with other transponder channels and amplification by a single, common TWTA or multiple paralleled TWTAs. Power control commands can be sent to the spacecraft on a specific control channel reserved for that purpose using, for example, the shaped Gregorian antenna 26C that was shown in FIG. 2A.

In FIG. 1B the exemplary prior art configuration of FIG. 1A is modified to insert hybrid combiners 5 to combine the outputs of gain controlled channel amplifier circuits 4 for beam #1 and the gain controlled channel amplifier circuits 4 for beam #2. The combined outputs are then buffered and linearized with linearizer 6 before being applied to TWTAs 2. The ground stations assigned to each hybrid 5 and TWTA 2 are selected such that the worst case maximum power will not exceed the power that can be accommodated by the channelized spot beam. As but one example, for beam #1 the GSs 1–4 may be at frequencies of 30.3, 30.2, 29.9 and 29.8 GHz, and the downconverted signals applied to the TWTA 2 may be at 20.3, 20.2, 19.9 and 19.8 GHz. The bandwidth of the TWTA may be at least 500 MHz.

The linearizer 6 can be conventional in construction, and is preferably selected to maximize the TWTA Noise Power Ratio (NPR). As the NPR increases the TWTA linearity increases, and undesirable inter-modulation products decrease.

Each groundstation can monitor the resulting downlink beam and thereby compensate for signal impairments, such as rain fades. Being that the uplink is at a higher frequency than the downlink, the effect of rain will be more severe on the uplink than the downlink. However, each groundstation is enabled to separately gain control its own beam, prior to combining and power amplification, so as not to impact the power in the other beams also being amplified by the TWTA 2.

It can be noticed as well that the OMUXs 3 of FIG. 1A can be removed, thereby eliminating the DC power losses in these typically inefficient components.

The use of this aspect of the invention thus enables multiple ground stations with assigned transponder channels to have RF power and gain control in an assigned spot or regional beam, with minimal effects to neighboring ground station signal(s). In the inventive satellite communications system there is a sharing of the amount of gain and power control between the ground station and the spacecraft. For a given spot or regional beam there is determined a number of ground stations that can share a common TWTA, without exceeding the capability of the TWTA under worse case conditions, and then an assignment is made of separate channel amplifiers for each ground station. A summation of the channel amplifier outputs is applied to a common linearizer that drives a common TWTA or multiple paralleled TWTAs. This technique enables a single type and size of TWTA to be used on a given spacecraft, thereby lowering cost and complexity, as well as power consumption.

In this embodiment an analysis of multiple transponder channels in a nonlinear system is performed to determine the number of transponders that can be used for each of the multiple ground stations, each having their own spacecraft channel amplifiers, to drive a linearized TWTA or multiple paralleled TWTAs into one beam. This technique thus further eliminates output multiplexer losses which can directly impact the spacecraft's power and thermal efficiency.

An example of this invention is a method of distributing digital data, such as digital television data, using multiple spot beams with different shapes and sizes to fully cover and serve designated market areas (DMAs) using multiple spacecraft in a geosynchronous orbit. Each spot beam can contain multiple ground stations. Each ground station can be assigned multiple transponder channels and has the ability to adjust transponder channel power or gain. By assigning a channel amplifier for each ground station, multiple ground stations can share a TWTA or multiple paralleled TWTAs.

In a further aspect this invention teaches a spacecraft communication payload design to reduce the number of receivers and the dc power consumption of the payload system. This is done by using input multiplexers to sum signals arriving from multiple spot or regional beams, while being selective in this summing to avoid the use of the same transponder channels in the same input multiplexer. The summed output is then taken to a single receiver.

Figure 1D:
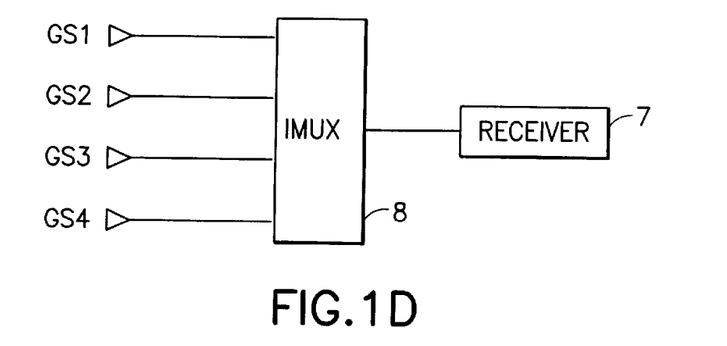
FIG. 1D is a simplified block diagram of the portion of a spacecraft communications payload in accordance with a further aspect of this invention, wherein a plurality of transponder channels are instead combined in an input multiplexer (IMUX) and fed to a single receiver.
Figure 1E:
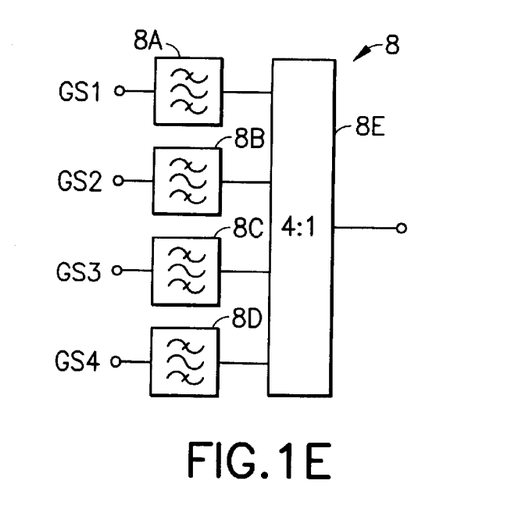
FIG. 1E illustrates the IMUX of FIG. 1D in greater detail for the exemplary 4:1 configuration.

Referring to FIG. 1D, the embodiment of FIG. 3B can be modified so as to provide a single receiver 7 that serves multiple uplinks, with an input multiplexer (IMUX) 8 being used to first combine the uplink signals. FIG. 1E illustrates the IMUX 8 of FIG. 1D in greater detail. It can be seen that each IMUX 8 is comprised of a plurality of n resonant filters, shown as four bandpass filters 8A–8D, whose output nodes are coupled to an n:1 hybrid combiner. The effect is to sum n narrower bandwidth, different frequency feeds into one wider bandwidth output signal. The characteristics of the bandpass filters 8A–8D are selected so as to achieve adjacent channel band rejection, and the hybrid 8E is selected so as to have a bandwidth sufficient to accommodate the bandwidth of the input feeds.

As but one example, for a Ka-band case a total spectrum of 500 MHz is partitioned into 27 MHz channels, each bandpass filter of the IMUX 8 is optimized to operate with one of the 27 MHz channels, and the receiver/downconverter 7 has a bandwidth of 500 MHz.

This aspect of the invention thus enables the use of the input multiplexers 8 that are considerably smaller and less expensive than the individual receivers of FIG. 1C. A single one of the input multiplexers 8 sums multiple beams and/or feeds into the single receiver 7, and thus significantly reduces the number of receivers required for a given payload architecture. The single receiver 7 is preferably designed to perform in the linear region to minimize co-channel interference and third order intermodulation products. The single receiver 7 is assumed for the purposes of this invention to include a low noise amplifier (LNA) that feeds a downconversion mixer circuit operating with a generated local oscillator signal. The receiver 7 is further assumed to have a bandwidth sufficient for accommodating the bandwidth requirements of the multiple combined inputs.

An example of the use of this invention is a unique method of distributing digital data using multiple spot beams with different shapes and sizes to fully cover and service the United States Nielsen designated market areas (DMAs) using multiple spacecraft in a geosynchronous orbit. Each spot beam has an assigned set of transponders, and allocated transponders of one or more spot beams can are then multiplexed and summed into the same single receiver 7. This communications payload system design significantly reduces the number of required receivers 7, compared to payload systems designed in accordance with the prior art.

Figure 4A:
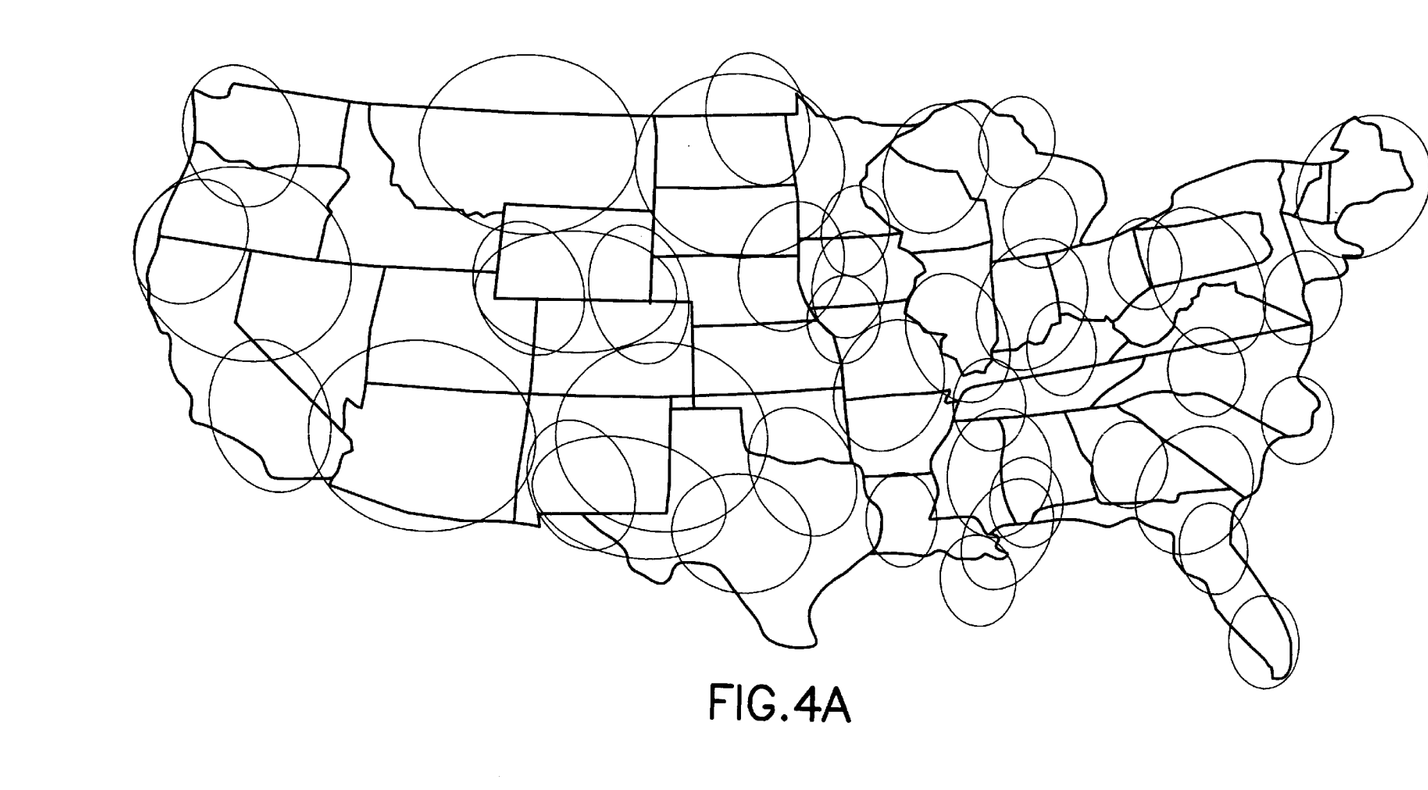
FIGS. 4A and 4B illustrate various exemplary spot beam sizes and shapes for a first communications spacecraft (FIG. 4A) and a second communications spacecraft (FIG. 4B) that cooperate, as in FIG. 2C, to provide direct spacecraft television coverage to the continental United States.
Figure 4B:
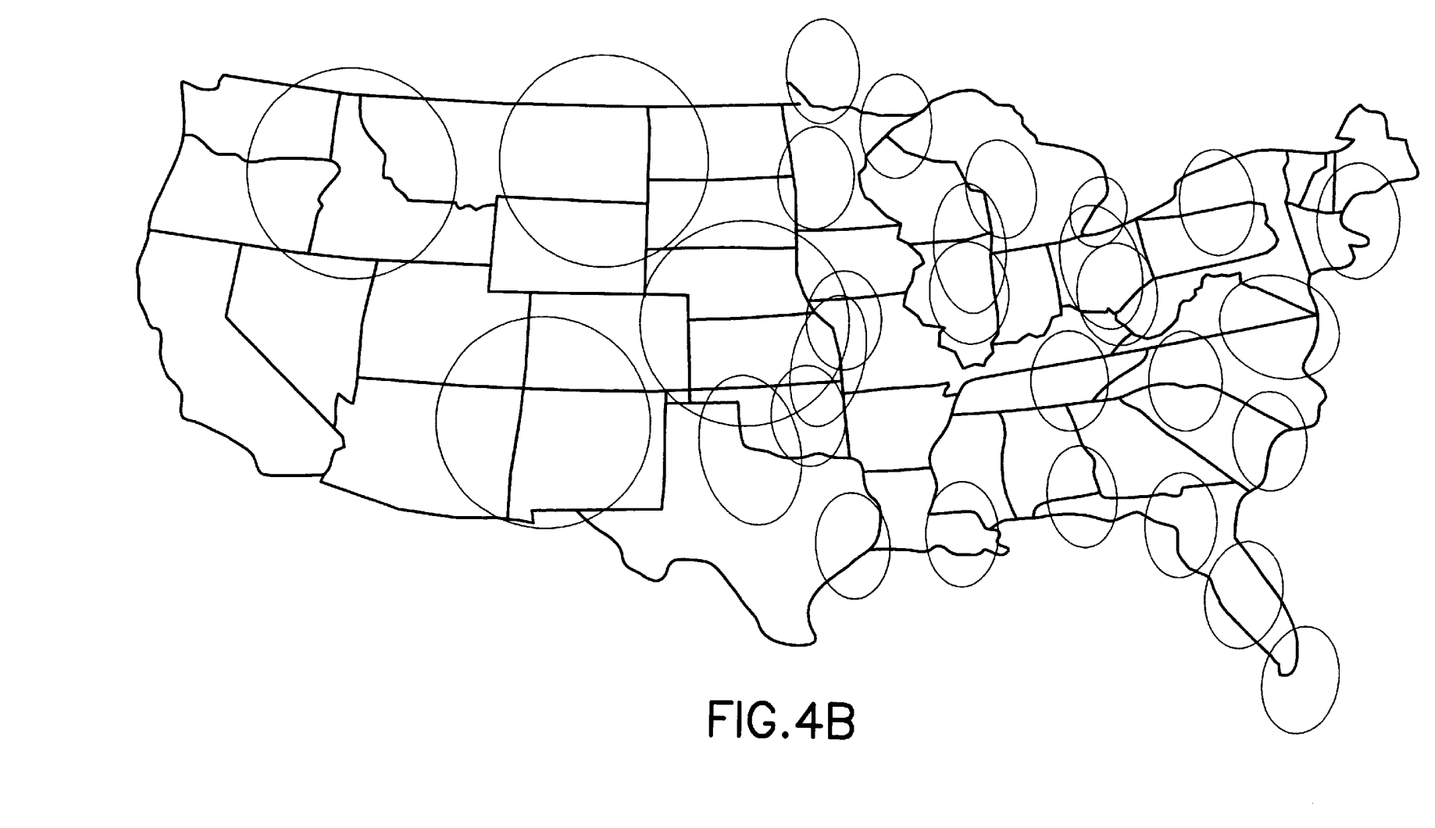

Referring now to FIGS. 4A and 4B, a further aspect of this invention is an ability to use the spacecraft communication system to deliver digital data from a ground station within a spot beam to the same spot beam, one way, via various antenna spot beam patterns. The patterns use a variation of different sized spot beams each having either a noncircular shape, such as an elliptical shape, or a circular shape, or a combination of both shapes to cover an entire geographical area that is to be serviced. This type of service can thus accommodate differences in markets, demographics, languages, etc.

Figure 2C:
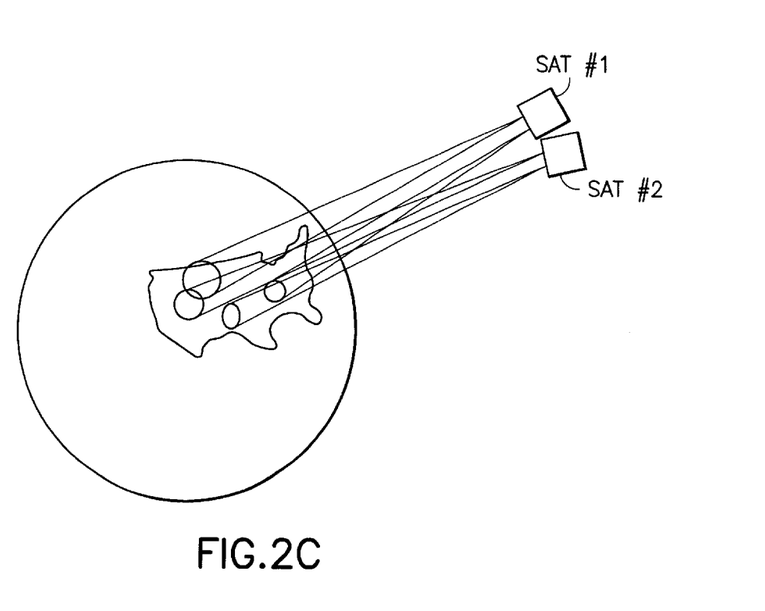
FIG. 2C depicts a two spacecraft communication system in accordance with an aspect of this invention.

A combination of non-circular and circular spot beams of different sizes is used in the preferred embodiment of this invention to form a non-contiguous pattern of non-contiguous zones, thereby providing enhanced interbeam isolation. An example of the utility of this invention is an ability to provide coverage of all of the CONUS Nielsen DMAs with two spacecraft in a single or multiple geosynchronous orbits, as shown in FIG. 2C. This technique improves frequency reuse of a given bandwidth, with a minimum set of antennas and spacecraft, versus a conventional contiguous approach for the spot beam locations.

In the preferred, but not limiting, embodiment shown in FIG. 2C there are two spacecraft in a single geosynchronous orbit location, e.g., within about 0.2°, that are used to cover all of the DMAs using alternate spot beam locations between the two spacecraft. Each spacecraft uplinks in a single polarity, but opposite from the other spacecraft.

More specifically, spacecraft #1 uplinks either RHCP or LHCP and spacecraft #2 uplinks either LHCP or RHCP (in an opposite polarity), or spacecraft #1 uplinks in a vertical linear polarization and spacecraft #2 uplinks in a horizontal linear polarization, or vice versa.

The downlink for each spacecraft is the opposite of its uplink polarity. For example, spacecraft #1 uplinks in RHCP and downlinks in LHCP, while spacecraft #2 uplinks in LHCP and downlinks in RHCP, or spacecraft #1 uplinks in vertical linear and downlinks in horizontal linear, while spacecraft #2 uplinks in horizontal linear and downlinks in vertical linear polarization.

The two spacecraft system design can either use all different size non-circular spot beams, all different size circular spot beams, or a combination of different size non-circular and circular spot beams to cover all of the DMAs. General techniques for forming different sized spot beams with reflector antennas of the type described above, as well as for forming either circular or non-circular spot beams, are known to those skilled in the art, but not the combination of different sized and shaped spot beams for covering various terrestrial regions, enabling improved frequency reuse and a reduction in interbeam interference, as described herein.

As but one example, the 3 meter circular antenna 18 could be instead an elliptical antenna having dimensions of 3.2 meters by 2.5 meters for forming elliptical as opposed to circular beams.

It should further be realized that the teaching of this invention is not limited for use with two spacecraft operating with different polarizations. For example, there could be three or more spacecraft each operating with dual polarization.

Thus, while the invention has been particularly shown and described with respect to preferred embodiments thereof, it will be understood by those skilled in the art that changes in form and details may be made therein without departing from the scope and spirit of the invention.

What is claimed is:

1. A communication system, comprising:
    a plurality of spacecraft in geosynchronous orbit, each spacecraft cooperating to provide a fixed plurality of beams on the surface of the earth; and
    a fixed plurality of ground stations individual ones of which are located in one of said beams for transmitting uplink signals to one of said spacecraft; wherein each spacecraft is comprised of:
        a plurality of input hybrids, each input hybrid being for receiving a plurality of the uplink signals from ground stations and for combining said uplink signals,
        a plurality of receivers, a single receiver being coupled to an output of each input hybrid, each receiver being for receiving a combined plurality of uplink signals combined by one of said input hybrids, each receiver having a frequency translator for translating the received combined uplink signals to a transmission frequency of a plurality of downlink signals,
        a plurality of channel amplifiers, a single channel amplifier being coupled to an output of an input multiplexer filter, an input of the input multiplexer filter being connected to an output of a respective receiver, each channel amplifier being for amplifying one of the downlink signals,
        at least one output hybrid for combining a plurality of outputs of said channel amplifiers, and
        a plurality of transmitters, each transmitter being for receiving an output from one of said hybrids and for transmitting the plurality of downlink signals within the same beams as the corresponding uplink signals.

2. A system as in claim 1, wherein each of said plurality of channel amplifiers is gain controlled by a corresponding one of said ground stations.

3. A system as in claim 1, wherein the portion of the surface of the earth is CONUS.

4. A system as in claim 1, wherein uplink beams to a first one of said satellites have a first polarization and downlink beams have a second, opposite polarization, and wherein uplink beams to a second one of said satellites have said second polarization and downlink beams have said first polarization.

5. A system as in claim 1, wherein the uplink and downlink signals comprise digital data signals.

6. A system as in claim 1, wherein the uplink and downlink signals comprise digital television signals.

7. A system as in claim 6, wherein individual ones of said spot beams overlie a predetermined one of a designated television market area.

8. A system as in claim 1, wherein each spacecraft is comprised of a plurality of different sized reflector antennas for both transmitting and receiving said beams.

9. A system as in claim 1, wherein each spacecraft is comprised of a plurality of reflector antennas for both transmitting and receiving said beams, wherein at least two of said reflector antennas have different shapes.

10. A system as in claim 1, wherein each spacecraft is comprised of a plurality of reflector antennas for both transmitting and receiving said beams, wherein said plurality of reflector antennas are each comprised of a Gregorian antenna.

11. A system as in claim 1, wherein each spacecraft is comprised of a plurality of reflector antennas for both transmitting and receiving said beams, wherein said plurality of reflector antennas are each comprised of a Cassegrain antenna.

12. A system as in claim 1, wherein uplink beams to a first one of said satellites have a right hand circular polarization (RHCP) and downlink beams have a left hand circular polarization (LHCP), and wherein uplink beams to a second one of said satellites have LHCP and downlink beams have RHCP.

13. A communication satellite for providing a fixed plurality of beams on the surface of the earth and for receiving uplink signals from a fixed plurality of ground stations individual ones of which are located in one of said beams, said satellite comprising:
    a plurality of input hybrids, each input hybrid being for receiving a plurality of the uplink signals from one or multiple ground stations per beam and for combining said uplink signals, a plurality of receivers, each receiver being for receiving a plurality of uplink signals combined by one of said input hybrids, each input hybrid adapted to sum a selected plurality of uplink signals in order to fill an uplink spectrum, each receiver having a frequency translator for translating the received uplink signals to a transmission frequency of a plurality of downlink signals, a plurality of channel amplifiers, each channel amplifier associated with each ground station and being for amplifying one or a set of said downlink signals associated with each ground station wherein a gain of each channel amplifier is controlled by a respective ground station, at least one output hybrid for combining a plurality of outputs of said channel amplifiers, and a plurality of transmitters for transmitting a plurality of amplified downlink signals within the same beams as the corresponding uplink signals.

14. A communication satellite as in claim 13, further comprising an output linearizer disposed between an output of each one of said output hybrids and one of said plurality of transmitters.

15. A communication satellite as in claim 13, wherein each of said transmitters is a linearized TWTA.

16. A communication satellite as in claim 13, wherein said beams have different sizes and one or both are of a circular shape or a non-circular shape, said wherein at least some of said plurality of beams are non-contiguous and non-overlapping over at least a portion of the surface of the earth.

17. A system as in claim 1, further comprising an output linearizer disposed between an output of each one of said output hybrids and one of said plurality of transmitters.

18. A system as in claim 1, wherein each of said transmitters is a linearized TWTA.

19. A system as in claim 1, wherein said beams have at least one of different sizes and shapes, and at least some of said beams are non-contiguous over a portion of the surface of the earth.

20. A satellite communication system comprising:

a plurality of spacecraft in a geosynchronous orbit providing a plurality of beams on a surface of the earth;

a plurality of individual ground stations, each ground station located in one of the beams and adapted to transmit uplink signals to the spacecraft;

at least one input hybrid for combining a one or multiple ground stations per beam, each input hybrid including a multiplexer adapted to sum a selected plurality of uplink transponder signals in order to fill up an uplink spectrum of a receiver;

the receiver being coupled to an output of the input hybrid, each receiver adapted to frequency translate the sum of the selected plurality of uplink transponder signals into a transmission frequency of a downlink signal;

a multiplexer coupled to an output of each receiver, the multiplexer adapted to separate out one or a set of transponder signal associated with each ground station;

a channel amplifier associated with each ground station coupled to each output of the input multiplexer and adapted to amplify each one or set of transponder signals associated with each ground station, wherein a gain of each channel amplifier is controlled by a respective ground station; and a plurality of transmitters for transmitting the plurality of amplified one or set of transponder signals within the same beams as the corresponding uplink transponder signals.

21. The system of claim 20 wherein each spot beam includes multiple ground station and each ground station has multiple transponder channels.

22. The system of claim 20 wherein the system comprises a first satellite and a second satellite using alternate spot beam locations between the two satellites to cover all designated market areas, the first satellite adapted to uplink signals in a right hand circular polarization and downlink in a lefthand circular polarization, the second satellite adapted to uplink in a left hand circular polarization and downlink in a right hand circular polarization.

23. The system of claim 20 wherein the input hybrid is adapted to sum multiple beams, each beam having one or multiple ground stations per beam, into each receiver in order to fill up each transponder channel in the receiver.

24. The system of claim 20 further comprising a high power amplifier coupled to the output of the output hybrid, the power amplifier adapted to amplify the transponders of each beam as a group before being transmitted by the transmitter.

25. The communication system of claim 1 wherein each channel amplifier is associated with each ground station, wherein a gain of each channel amplifier is controlled by a respective ground station.

26. The communication system of claim 1 further comprising a multiplexer coupled to an output of each receiver, each multiplexer adapted to separate out one or a set of uplink signals associated with each ground station.

* * * * *